March 20, 1973 J. W. CRITSER 3,721,881

LINE FOLLOWING APPARATUS

Filed July 22, 1971 6 Sheets-Sheet 1

INVENTOR
JACK W. CRITSER

March 20, 1973 J. W. CRITSER 3,721,881

LINE FOLLOWING APPARATUS

Filed July 22, 1971 6 Sheets-Sheet 2

INVENTOR

JACK W. CRITSER

INVENTOR
JACK W. CRITSER

LINE FOLLOWING APPARATUS

Filed July 22, 1971 6 Sheets-Sheet 4

INVENTOR

JACK W. CRITSER

INVENTOR
JACK CRITSER

BY Cushman, Darby & Cushman
ATTORNEYS

LINE FOLLOWING APPARATUS

Filed July 22, 1971

INVENTOR
JACK CRITSER
BY Cushman, Darby & Cushman
ATTORNEYS

United States Patent Office 3,721,881 Patented Mar. 20, 1973

3,721,881
LINE FOLLOWING APPARATUS
Jack W. Critser, Miachelville, Md., assignor to Instronics Ltd., Stittsville, Ontario, Canada
Filed July 22, 1971, Ser. No. 165,291
Int. Cl. G05b *19/36, 19/42*
U.S. Cl. 318—568 11 Claims

ABSTRACT OF THE DISCLOSURE

Apparatus for providing the X and Y coordinates of selected points on a line as it is traced on a board by a manually movable sensor including an X coordinate radiation source comprising a first stretched wire running beneath the board parallel to the Y axis and a Y coordinate radiation source comprising a second stretched wire running beneath the board parallel to the X axis. Signals derived from the sensor are applied to X and Y servo motors for individually moving the first and second wires in order to track the sensor as it is manually moved.

BRIEF DESCRIPTION OF THE PRIOR ART AND SUMMARY OF THE INVENTION

The invention relates to an apparatus for providing the X and Y coordinates of selected points on a line as it is traced by a manually movable index.

Many instances exist in which it is desirable to be able to manually trace a curve or line, for example, on a chart, map or the like and automatically derive analog or digital electronic signals representing the coordinates, with respect to some set of axes, of points on that line. Such signals can then be employed by a digital computer or other device to reproduce the traced curve, to generate the mathematical relations expressed in a collection of coordinate points derived from the tracing or to perform any other desirable function. Such devices are used particularly in connection with digital computers for automatically supplying X and Y coordinates of various points along a traced curve relative to some reference point and axis.

A variety of devices for performing such curve following are currently available. Some of these devices, such as shown, for example, in the Inaba patent, 2,988,643, and the Von Voros patent, 3,135,857, operate by detecting the light reflected from a point and then moving a light sensor or sensors to trace a line in accordance with a logical decision made on the basis of the intensity and distribution of the reflected light pattern. While relatively accurate, such devices are relatively expensive and accordingly are not suitable for many applications. Similar devices operate to follow a manually operated sensor or source. Other analogous devices are essentially mechanical in nature and, while relatively cheap are, also are relatively inaccurate and for that reason likewise unsatisfactory for many applications.

One chart reading apparatus is described in a patent application entitled Chart Reading Apparatus by Eugene Allen Cameron, Ser. No. 868,835, filed Oct. 23, 1969, which discloses an arrangement which is much simpler than the above mentioned mechanical curve followers and at the same time of the order of accuracy and much less expensive than electronic curve following devices. In this arrangement, a source of radiation located below a table top is moved by servo means to follow manual movement of an index bearing radiation sensing means as the index is manually traced over a line on a charge, map or the like. The servo means operate X and Y encoders and the operator by actuation of a read-out switch associated with the apparatus can selected those points for which the X and Y coordinates are to be provided at outputs, for example, to a digital computer.

In the apparatus disclosed in the above-mentioned Cameron application, the radiation source comprises a pair of coils mounted at right angles to one another upon a slider which is in turn mounted upon an arm for movement along that arm. The arm is in turn fastened at its ends to two bars which are mounted along opposing edges of the tracing board. Two separate cable arrangements link the arm and the two bars which are transverse to it, respectively, to separate X and Y servo motors, so that the radiation source coils mounted upon the slider can follow the movements of the sensor atop the tracing board as it traces a line atop the board.

The electrical signal applied to one of the transverse radiation source coils differs from the signal applied to the other coil, for example, by being shifted 90° in phase, so that the X and Y components of the signal detected by the sensor tracing the curve can be separated to determine the direction of the sensor with respect to the X and Y radiation coils and generate appropriate electrical signals to cause the X and Y servo motors to move the slider accordingly until the two coils are positioned with their intersection exactly beneath the crosshairs of the sensor. In this fashion, the radiation coils very closely track the position of the manually moved sensor as it traces the curve and the shaft position of each of the servo motors can be employed to generate analog or digital signals for use by a digital computer or other device.

While a substantial improvement over the prior art as represented by the above discussed patents, the apparatus shown in the Cameron patent application has a number of drawbacks. First, because the two transverse mounted radiation coils have a high density, relatively flat electromagnetic field, the system cannot track a sensor once the sensor and radiation source coils have been separated by more than a short distance. Further, mounting the two transverse coils together on the same slider in exact alignment with respect to each other and to the other elements of the system is a difficult and time consuming chore. Even if the two coils are initially aligned exactly, they can become misaligned during use and produce signals which are relatively inaccurate. In addition, the relatively large mass of the slider and all the elements associated with it which must move in response to movements of the manually operated sensor creates problems in quickly starting and stopping that mass.

The present invention relates to an improvement in the above described apparatus of Cameron wherein the X and Y radiation sources are two stretched wires which both extend perpendicular to each other beneath the board for its length and width, respectively, and which are preferably separately moved by the X and Y servo motors, respectively. This greatly reduces the effect of gantry inaccuracies on the output accuracy.

The wire and its supports which form the gantry have a relatively low mass compared to the complex radiation source arrangement of the previously discussed Cameron patent application. Accordingly, less compensation is required to deal with the effects of that mass as the wire is moved in response to manual movements of the sensor in tracing a line or curve, and the response and cast of the gantry are substantially improved. A thinner and more aesthetic table can also be used.

Employing separately movable sources for the X and Y coordinates eliminates the need for carefully aligning two separate coils onto a single index. In fact, the entire system for moving the radiation sources is considerably simpler than in the above discussed Cameron patent application and for that reason the novel invention of this application, as discussed in detail below, can be produced considerably cheaper than previous devices.

Since both the X and Y tracks are fixed, this novel system also lends itself readily to the use of linear encoders. The elimination of induction in the transmitter also improves electrical detection which permits driving the transmitter with square rather than sine waves. This in turn simplifies the relation of the detector to phase rather than amplitude and phase as is the case in the above-mentioned Cameron system.

Many other objects and purpose of the invention will become clear from the following detailed description of the drawings.

DETAILED DESCRIPTION OF THE DRAWINGS

Figure 1:
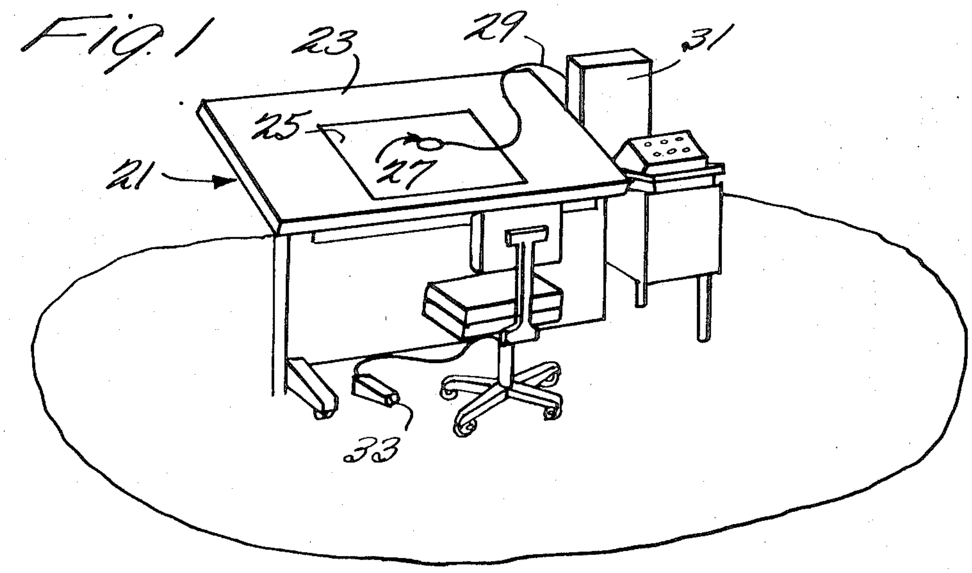
FIG. 1 shows a pictorial view of a line-tracing device according to the present invention.

Reference is now made to FIG. 1 which shows a line-tracing apparatus 20 such as disclosed in the above-mentioned Cameron patent application and as in this invention is discussed below. In this arrangement, a stand 21 carries a planar table top unit 23 atop which a map 25 or other drawing to be traced can be placed. The operator stands or sits in front of the drawing and moves over a desired line of the drawing a movable sensor or index 27 which is connected by a very light and flexible electrical lead 29 to associate electrical apparatus indicated generally as 31 and discusssed in detail below. When the operator desires apparatus 31 to read out the instantaneous X and Y coordinates of any point under cross-hairs or the like on sensor 27, he operates a foot pedal 33 to cause apparatus 31 to generate appropriate output signals representating the coordinates of the location of sensor 27. Thus, the operator is able to select those points at which he is satisfied sensor 27 is properly positioned relative to a desired line point, and to generate a set of X and Y coordinates of these points which characterize the curve or line being traced, and which can then be employed to reproduce that line or curve or for any other purpose. A record is made of the coordinates of the selected points, and if desired these coordinates can be displayed, for example, on a 5–6 digit "Nixie" display for each of the X and Y axes.

Figure 2:
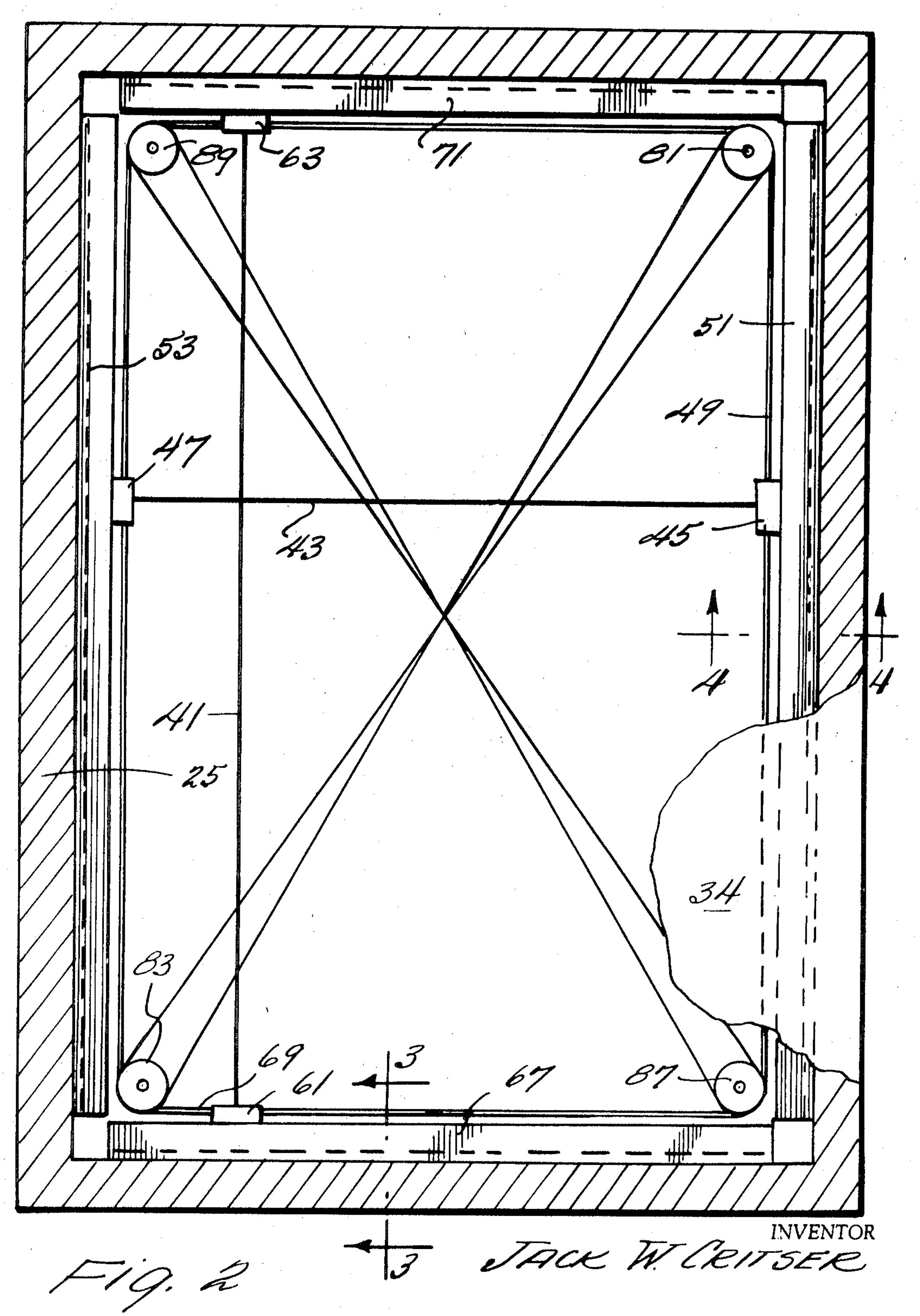
FIG. 2 is a plan view of the working parts of a planar table top such as shown in FIG. 1 with most of the top thereof removed.
Figure 5:
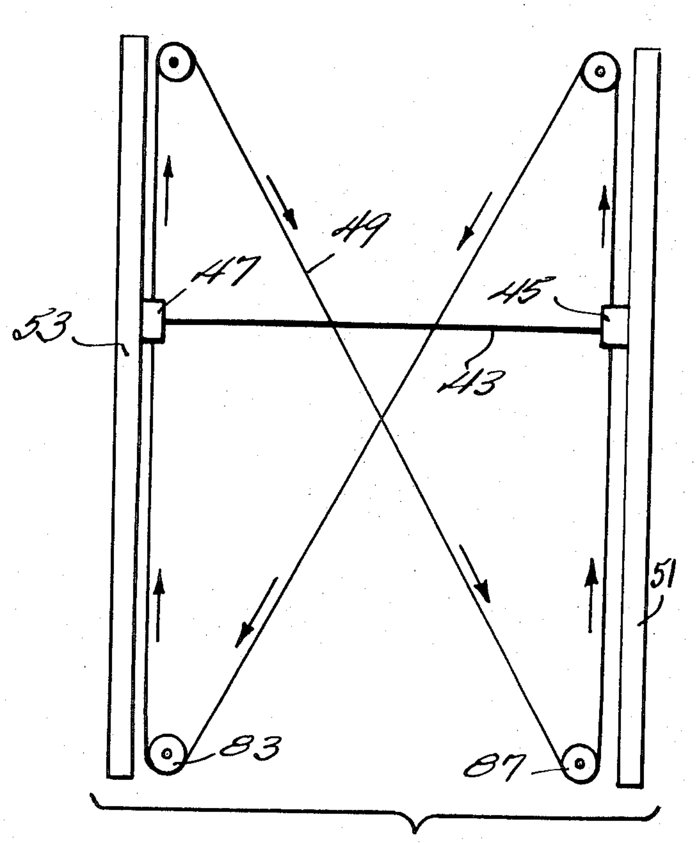
FIG. 5 is a schematic representation of the X or Y servo and cable arrangement.

FIG. 2 illustrates one embodiment of this invention with most of the top 34 of planar table top unit 23 on which the chart, map or the like is traced removed so that the X and Y radiation source wires and the arrangement for moving those wires in response to manual movement of sensor 27 can be seen. As can also be seen in FIGS. 3 and 4, unit 23 includes a rectangular frame 15 which may be of any suitable material and construction. Table top 34 rests atop frames 35, held there by any suitable means, and may be formed of a layer 37 of "Honeycomb" and "Formica" provided with a suitable top finish layer 39. The material comprising top 34 is preferably of the type which provides little hindrance to the passage of electromagnetic waves having a frequency in the range of the signals produced by the source wires, as discussed below, and detected by sensor 27, for example, electromagnetic signals having a frequency of about 3 kilocycles. A baseboard 39 is secured to frame 35 and encloses the bottom of unit 23.

As menioned briefly above, the X and Y radiation sources, which produce the signals detected by sensor 27 and then employed to determine the movements of sensor 27 in the X and Y directions, comprise a first length of stretched wire 41 disposed parallel to the Y axis and movable in the X direction under the control of the X coordinate and servo motor, and a second length of stretched wire 43 disposed parallel to the X axis and movable in the Y direction under control of the Y coordinate servo motor. It will, of course, be understood that the directions defined as the X and Y axes are arbitrary and two axes can be defined in any alternative fashion relative to unit 23. Wires 41 and 43 may be of any suitable material and of any suitable diameter, but small diameter lightweight wires are believed to be most satisfactory. The wires are depicted as thicker than the cables in FIG. 2 so that they can be visually differentiated and not to indicate necessarily that they differ in diameter.

Wire 43 is strung to a suitable tension between members 45 and 47 which are both affixed to cable 49 as shown and which can move together along a direction parallel to wire 41 and transverse to wire 43 when cable 49 is moved as discussed below. That tension can be adjusted to avoid natural frequencies which would interfere with the frequency of the electrical signals. Members 45 and 47 may be of any suitable shape, construction and of any suitable material. However, as discussed above, it is desirable to minimize the mass of elements which move in the system and accordingly the mass of the members to which wires 43 and 41 are attached should be as small as possible.

Figure 4:
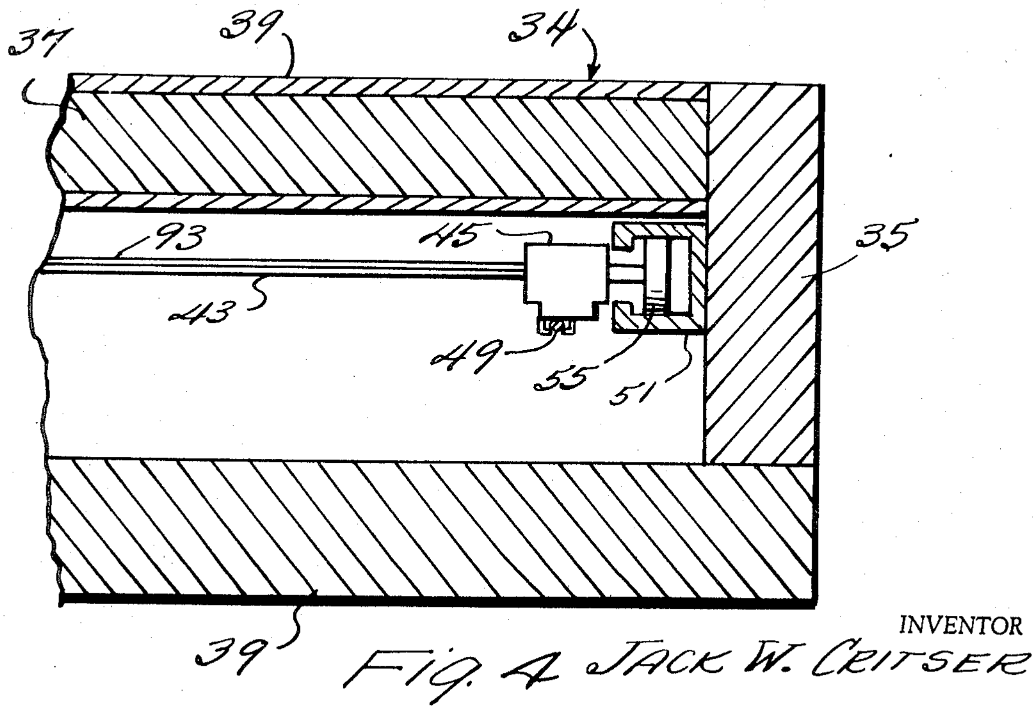
FIG. 4 is a sectional view of FIG. 2 taken along the lines 4—4.

Members 45 and 47 are adapted for movement along and partially within U-shaped tracks 51 and 53, respectively. Referring particularly to FIG. 4, member 45 includes a wheel 55 which permits member 45 to move along track 51, with wheel 55 rotating within track 51, when a force is applied to member 45 in either direction by cable 49 to which member 4 is fixed as shown. Member 47 is provided a similar wheel which is disposed in U-shaped track 53 to permit member 47 to move along track 53 when a suitable force is applied to it in either direction by cable 49 to which member 47 is also fixed.

Figure 3:
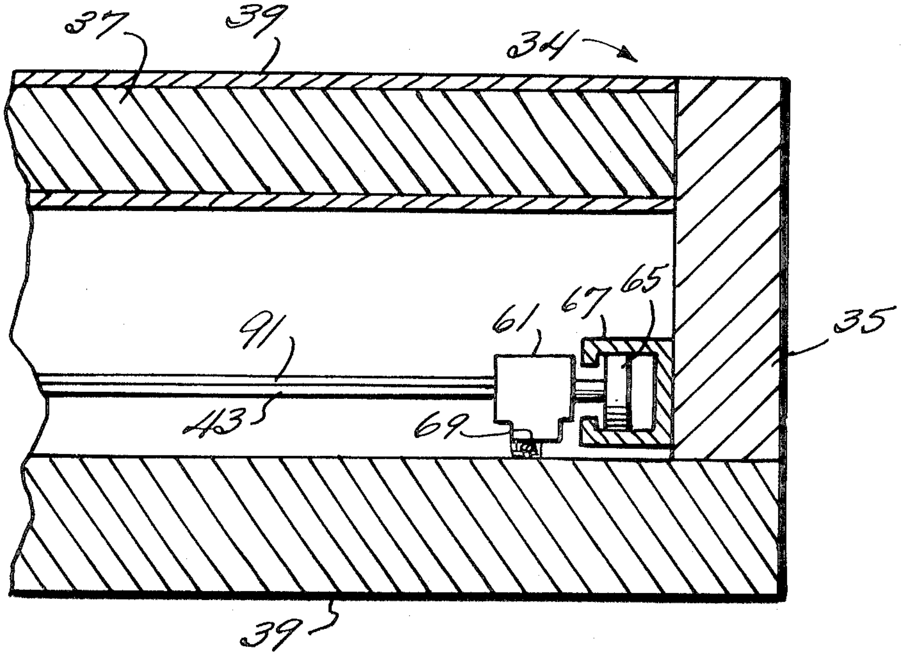
FIG. 3 is a sectional view of FIG. 2 taken along the lines 3—3.

Wire 41 is stretched between similar members 61 and 63. As can be seen in FIG. 3, member 61 is fixed to cable 69 and includes a wheel 65 which can be rotated within track 67 to permit element 61 to move along track 67 in response to the application of force in either direction to cable 69. Member 63 is similarly provided with a wheel which rides in track 71 to permit movement of member 63 along track 71. While this arrangement of wheels and U-shaped tracks is satisfactory, any alternative arrangement for permitting the members between which wires 41 and 43 are stretched to move together in the respective X and Y directions can be alternatively employed.

As should be apparent from FIGS. 3 and 4, wires 41 and 43 are disposed one above the other, and in this embodiment wire 43 is over wire 41. It is a matter of choice which wires overlies the other and, if desired, wire 41 can just as easily be disposed above wire 43. As mentioned briefly above, mounting the two radiation sources so that they can be moved separately eliminates the need for expensive and difficult alignment of two radiation sources on a single index and for complex arrangements for moving that index in both the X and Y direction. The simplicity of the novel embodiment of the invention illustrated in the drawings of this application in contrast to the complex device of the previously mentioned Cameron application should be apparent.

Figure 7:
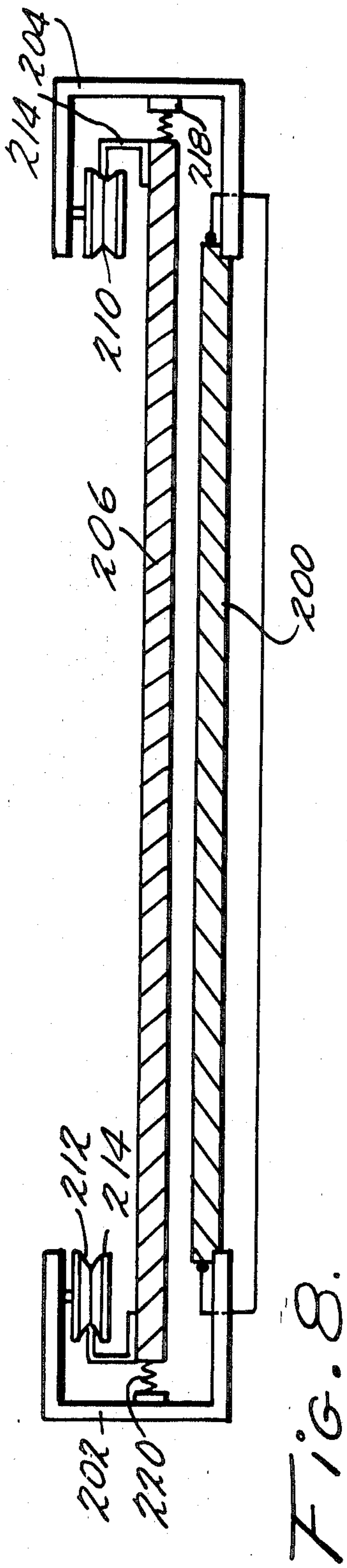
FIG. 7 is a cut away view of another arrangement for mounting and stretching one of the current carrying members.

FIG. 7 shows another arrangement for stretching the X and Y directions respectively. In this embodiment, current carrying member 200 is stretched between two supports 202 and 204 which are in turn movably mounted on board 206 which supports 202 and 204 include pulleys 210 and 212 which respectively engage rails 214 and 216. Rails 214 and 216 extend along the length of the board 206. Supports 202 and 204 are continuously urged away from board 206 by members 218 and 220 which are preferably loaded and maintain member 200 taut.

While a wire having a circular cross section can be successively employed, it will be understood that other shaped current carrying members can be used. In FIG. 7, member 200 is rectangular in cross section with the long dimension in the vertical. It may be more advantageous to mount the current carrying element so as to minimize vibration in the plane of the table top and thus minimize errors. Other shapes which provide a desirable field configuration or which damp vibration may be alternatively used.

Figure 8:
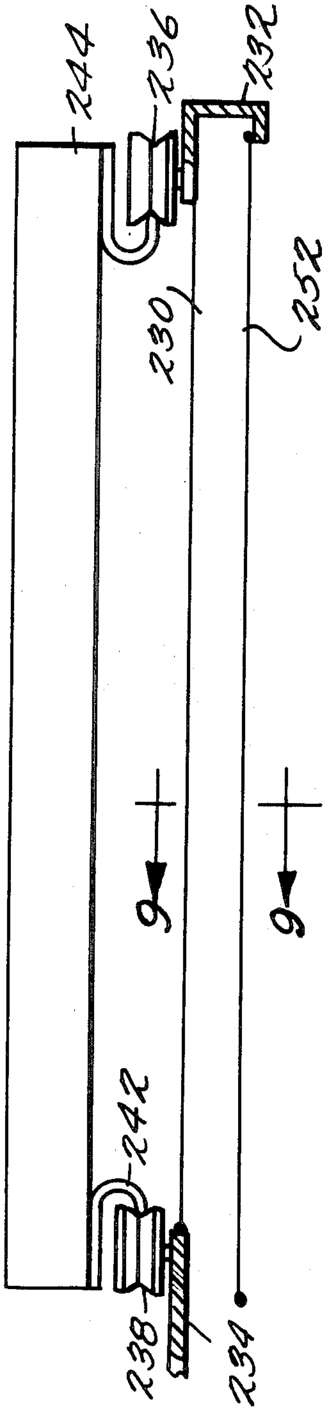
FIG. 8 is a cut away view of yet another arrangement for mounting and stretching one of the current carrying members.

FIG. 8 shows yet another wire stretching arrangement in which a wire 230 is mounted between two supports 232 and 234. Supports 232 and 234 respectively include pulleys 236 and 238 which engage rails 240 and 242 which are in turn fixed on board 244.

Figure 9:
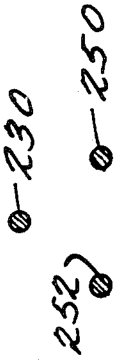
FIG. 9 shows a view of the arrangement of FIG. 8 along the lines 9—9.

In the arrangement of FIG. 8, the current carried from one side of board 244 to the other is returned via two return wires 250 and 252 which are disposed below and on either side of wire 230 as shown in FIG. 9. The arrangment has been found to be particularly advantageous with the fields generated by return wires 250 and 252 augmenting the field of wire 230. If desirable a metallic plate can be mounted below the return wires to capture the field which they generate.

Figure 6:
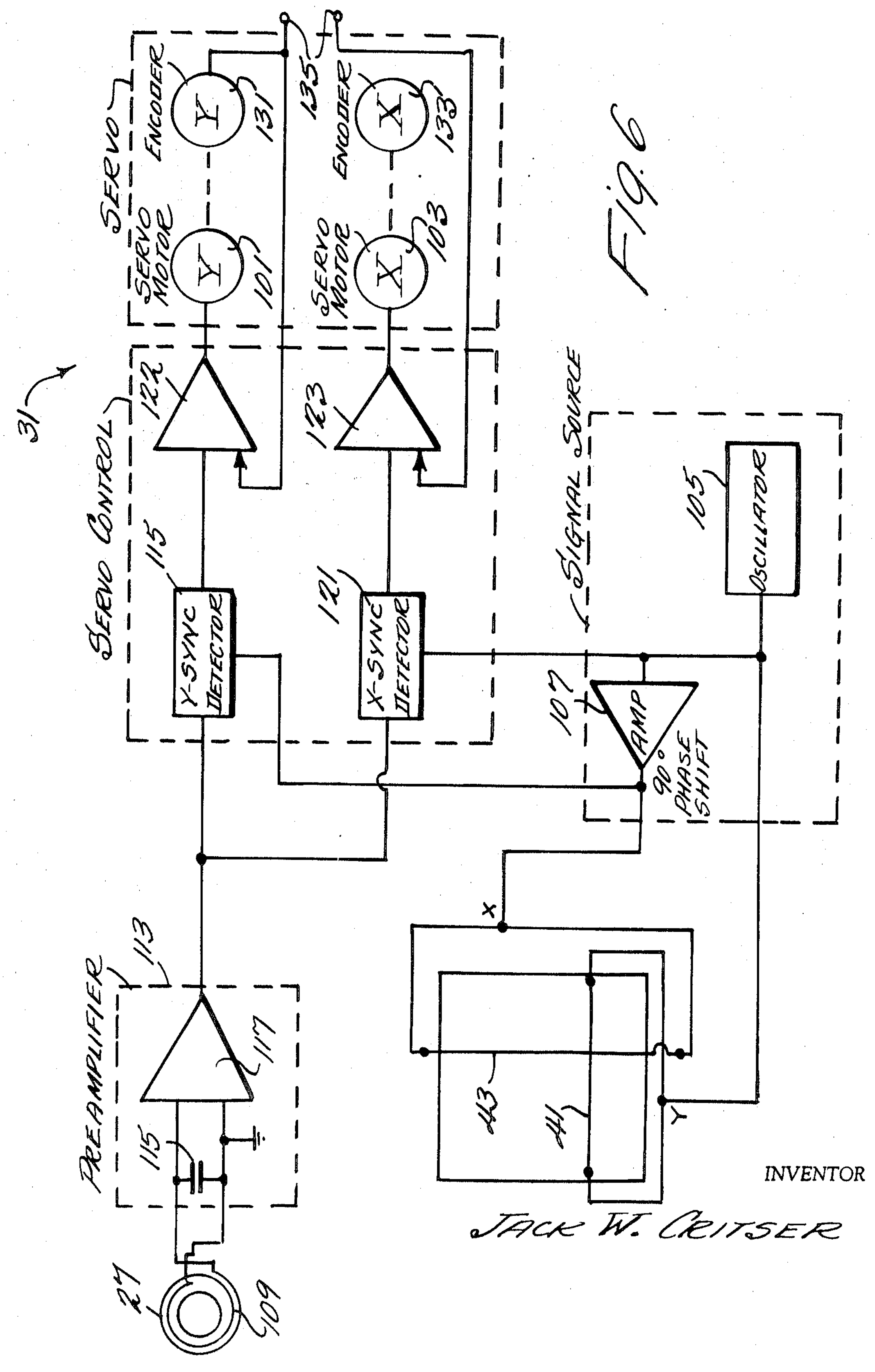
FIG. 6 is a schematic circuit diagram of the servo and encoder arrangement as well as the arrangement for generating and detecting the signals with the radiation sources for manually movable sensor.

As shown in FIG. 8, one portion of cable 49 is attached to member 45 and loops about pulleys 81 and 83 to attach to the opposite side of member 47. Similarly, the portion of cable 49 attached to the opposite side of member 47 loops about cables 85 and 87 to attach to the other side of member 45. FIG. 6 depicts schematically the manner in which cable 49 can be moved to cause wire 43 to move in a direction parallel to U-shaped tracks 51 and 53. As should be apparent from FIG. 6, applying a force to cable 49 in the direction designated by the arrows, for example, by a pulley appropriately coupled to the Y servo motor, causes two forces which are roughly identical to be applied in the direction of the arrows to members 47 and 49, respectively, so that they move constrained by U-shaped tracks 51 and 53, causing wire 43 to move in what has been defined as the Y direction.

Cable 69 similarly loops about a pulley which is disposed below pulley 83 and which cannot be seen in FIG. 2 and a pulley below pulley 81 to attach one side of member 63 to the opposite side of member 61. The other portion of cable 69 attaches one side of member 61 to the other side of member 63 via a pulley mounted below pulley 85 and a pulley mounted below pulley 87. The application of force in either direction to cable 69 causes roughly equal forces to be applied to members 61 and 63, respectively, so that they move wire 41 in the X direction in a manner directly analogous to the way in which wire 43 is moved as depicted in FIG. 6.

One potential difficulty with using wires as radiation sources is potential vibration of the wires as they are moved in the X and Y directions. While vibration may not be a problem in many applications, if it is a problem it can be easily damped by providing an element such as a piece of wire or felt atop the wire. In FIG. 3, a piece of material 91 is mounted atop wire 41 for this purpose, and in FIG. 4 a piece of material 93 is shown atop wire 43. An alternate solution to the vibration problem is to tighten the wires so that the resonant frequency of the wires is ordinarily high enough to be filtered out of the signal produced by sensor 27. This may not be practical in all instances, and it may not be necessary to provide any means for damping vibrations in the wires.

FIG. 6 illustrates a block diagram one system for applying signals to wires 41 and 43 for detecting the positions of these wires relative to sensor 27 and for operating X servo motor 101 and Y servo motor 103 so as to cause wires 41 and 43 to track the movements of sensor 27 as it is manually moved to trace a line. As shown, the Y radiation source, which in this embodiment comprises wire 41, is energized, for example, by a 3-kilocycle per second oscillator 105. The output of oscillator 105 is also preferably shifted 90° in phase by amplifier 107 and applied to the X radiation source, which in this embodiment comprises wire 43. Oscillator 105 can produce either square waves or sine waves as desired, but square waves have been found to be particularly useful. Shifting the signal applied to the X radiation source 90° with respect to the signal applied to the Y radiation source permits the two signals to be separated after detection by sensor 27. Any alternative arrangement for applying signals to the two sources which can be readily separated after detection can be employed, for example a simple time sharing arrangement. However, this particular arrangement is believed to be most satisfactory.

The manually movable sensor 27 preferably includes a circular glass window which is provided with crosshairs to define an exact reading for tracing a point. Sensor 27 may, for example, be two inches in diameter and may be wound with 200 turns of a pickup coil 109 having an inductance, for example, of 500 millihenries. Coil 109 is connected to the input terminals of the tuned pre-amplifier 113 which includes a capacitor 115 and an operational amplifier 117. Pre-amplifier 127 preferably has a pass band of about 20%, and thus eliminates any noise or other undesirable signals which are picked up by coil 109. The lead connecting coil 109 to pre-amplifier 113 is preferably screened and the output from pre-amplifier 113 is applied both to Y synchronous detector 119 and to an X synchronous detector 121. Reference signals from oscillator 105 and from phase shifting amplifier 107 are also supplied to synchronous detectors 121 and 119, respectively.

Synchronous detectors 119 and 121 may be of any suitable construction and may, for example, integrate the signal derived from pre-amplifier 113 to separate the X and Y components of the signal. Thus, synchronous detectors 119 and 121 each produce an electrical signal output indicating the direction of wires 41 and 43, respectively, with respect to sensor 27. The output of synchronous detector 119 is applied to the Y servo motor 101 via an operational amplifier 122 which is provided with a feedback path as shown. The servo loop operates to ascertain any error in positioning of sensor 27 relative to wires 41 and 43, and drives the servo motor 101 to correctly align wire 41 with sensor 27. Similarly, the output of synchronous detector 121 is applied to servo motor 103 via operational amplifier 123 to operate servo motor 103 so as to shift the position of wire 43 along the X axis until it is exactly aligned with sensor 27. Thus, as the sensor 27 is shifted manually to trace a curve, servo motors 101 and 103 operate to shift the position of wires 41 and 43, respectively, to keep the intersection of these wires exactly below the crosshairs of sensor 27 and accordingly provide an electrical output signal which indicates the exact position of the wires. At appropriate times the operator actuates the foot switch 23 so that the outputs of encodes 131 and 133 can be applied through terminals 135 to a suitable recording medium, for example, a magnetic tape.

The frequency of the radiation employed is preferably between 3 and 9 kilocycles per second.

Figure 10:
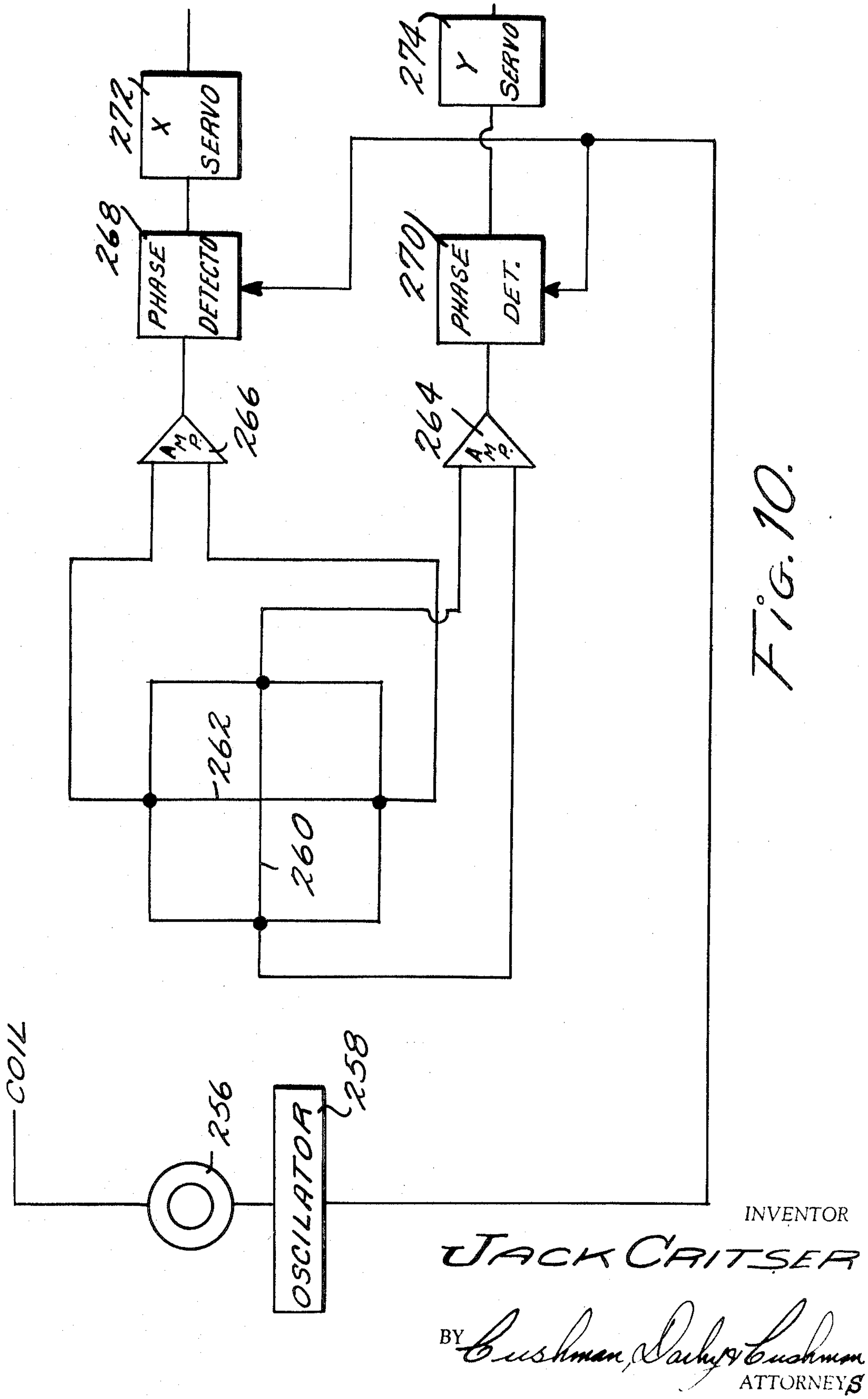
FIG. 10 is a schematic diagram of an alternative arrangement for driving the sensor and detecting the signals thus generated on the two transversely mounted wires.

While driving the transverse wires with the electrical signal and detecting the signal with the sensor atop the table is preferable, the signals can be applied to the sensor and detected by the two stretched wires. Such an arrangement retains many of the advantages which result from the reduction of mass in comparison with the Cameron arrangement. FIG. 10 shows one such arrangement in which a conventional oscillator 258 applies square wave or sinusoidal signals to a coil 256, which may be of the type discussed above. The signals thus generated are detected by transversely mounted wires 260 and 262 respectively. The output of amplifier 264 is applied to phase detector 270 together with the output of oscillator 258 so that a signal is applied to Y servo 272 which reflects the Y displacement between wire 260 and coil 256. Servo 272 then moves wire 260 to reduce that displacement. Similarly phase detector 268 produces a signal which is applied to X servo 274 so that servo 274 moves wire 262 in the X direction.

Many modifications and changes in the above embodiment of the invention can, of course, be made without departing from the scope of the invention. Accordingly, that scope is intended to be limited only by the scope of the appended claims.

What is claimed is:

1. Apparatus for producing signals indicating the locations of a plurality of points along a manually traced line comprising:

relatively planar board means for providing a support for a document or the like having a line to be traced, first radiation source means disposed beneath said board means including a first current carrying member extending linearly in a direction parallel to a first axis, means for holding said first member and means for permitting said first member holding means and first wire to move in a direction parallel to a second axis perpendicular to said first axis and for preventing said first member holding means and first member from moving in a direction parallel to said first axis, second radiation means disposed beneath said board means including a second current carrying member extending linearly in a direction parallel to said second axis, means for holding said second wire and means for permitting said second member holding means and said second member to move in a direction parallel to said first axis and for preventing said second member holding means and said second member from moving in a direction parallel to said second axis, means for supplying a first electrical signal to said first member so as to generate a field about said first member which varies in intensity as a function of the distance from said first member, means for supplying a second electrical signal to said second member so as to generate a field about said second member which varies in intensity as a function of the distance from said second wire, sensor means adapted for manually controlled movement along said board means so as to trace a line including means for detecting said field about said first and second members and for producing a first signal indicating the distance between said first member and said sensor means and a second signal indicating the distance between said second member and said sensor means, first servo means for receiving said first distance indicating signal and moving said first member and said first member holding means along said second axis to track said sensor means, and second servo means for receiving said second distance indicating signal and moving said second member and said second member holding means along said first axis to track said sensor means.

2. Apparatus as in claim 1 wherein each of said members is a wire and said holding means stretches the wire it holds.

3. Apparatus as in claim 1 wherein said first signal supplying means includes an oscillator connected to said first wire and said second signal producing means include means connected to said oscillator and to said second wire for receiving the output of said oscillator and shifting it in phase 90°.

4. Apparatus as in claim 1 further including means for damping vibrations of said first and second wires.

5. Apparatus as in claim 3 wherein said damping means includes a length of material disposed in contact with each of said first and second wires.

6. Apparatus as in claim 1 wherein said first and second servo means each includes a motor, said first servo means includes a cable connecting the motor of said first servo means to said first wire stretching means for moving said first wire and said first wire stretching means and said second servo means includes a cable connecting the motor of said second servo means to said second wire stretching means for moving said second wire and said second wire stretching means.

7. Apparatus as in claim 1 wherein said first and second servo means each includes a motor and further including means for detecting the shaft position of the motor of said first servo means and for producing an output signal indicating the position of said first wire along said second axis and means for detecting the shaft position of the motor of said second servo means and for producing an output signal indicating the position of said second wire along said first axis.

8. Apparatus as in claim 1 wherein said first signal producing means includes means coupling said first signal to one end of said first member at least a single return wire connected to the other end of said first member and extending along the length of said first member to return said length of said first member to return said first signal to the vicinity of said one end and wherein said second signal producing means includes means coupling said second signal to one end of said second member, at least a single return wire connected to the other end of said second member and extending along the length of said second member to return said second signal to the vicinity of said one end of said second member.

9. Apparatus as in claim 8 including first and second return wires extending along the length of said first member below and on either side of said first member and third and fourth return wires extending along the length of said second member below and on either side of said second member.

10. Apparatus for producing signals indicating the locations of a plurality of points along a manually traced line comprising:

relatively planar board means for providing a support for a document or the like having a line to be traced, first radiation means disposed beneath said board means including a first current carrying member extending linearly in a direction parallel to a first axis, means for holding said first member, means for permitting said first member holding means and first member to move in a direction parallel to a second axis perpendicular to said first axis and for preventing said first member holding means and first member from moving in a direction parallel to said first axis, a second current carrying member extending linearly in a direction parallel to said second axis, means for holding said second member and means for permitting said second member holding means and said second member to move in a direction parallel to said first axis and for preventing said second member holding means and said second member from moving in a direction parallel to said second axis, second radiation means adapted for manually controlled movement along said board means so as to trace a line, means for supplying an electrical signal to one of said radiation means, means for detecting the electrical signal generated at the other one of said radiation means by the supplying of the electrical signal to said one radiation means, and means for producing a first signal indicating the distance between said first member and second second radiation means and a second signal indicating the distance between said second member and said second radiation means, first servo means for receiving said first signal and moving said first member and said first member stretching means along said second axis to track said second radiation means, and second servo means for receiving said second signal and moving said second member and said second member stretching means along said first axis to track said second radiation means.

11. Apparatus as in claim 10 wherein said supplying means supplies a signal to said second radiation means and wherein said second radiation means is a coil.

References Cited

UNITED STATES PATENTS

| | | | |
|---|---|---|---|
| 3,473,157 | 10/1969 | Little et al. | 318—568 X |
| 2,679,620 | 5/1954 | Berry | 318—576 |

THOMAS E. LYNCH, Primary Examiner

U.S. Cl. X.R.

318—576